United States Patent
Kickert (10) Patent No.: US 11,985,928 B2
(45) Date of Patent: May 21, 2024

(54) AIR DISTRIBUTION CONDUIT

(71) Applicant: VAN DER HOEVEN HORTICULTURAL PROJECTS B.V., Den Hoorn (NL)

(72) Inventor: Vincent Martijn Kickert, Den Hoorn (NL)

(73) Assignee: VAN DER HOEVEN HORTICULTURAL PROJECTS B.V., Den Hoorn (NL)

(*) Notice: Subject to any disclaimer, the term of this patent is extended or adjusted under 35 U.S.C. 154(b) by 575 days.

(21) Appl. No.: 17/040,681

(22) PCT Filed: Mar. 25, 2019

(86) PCT No.: PCT/EP2019/057363
§ 371 (c)(1),
(2) Date: Sep. 23, 2020

(87) PCT Pub. No.: WO2019/185503
PCT Pub. Date: Oct. 3, 2019

(65) Prior Publication Data
US 2021/0161082 A1    Jun. 3, 2021

(30) Foreign Application Priority Data

Mar. 26, 2018 (NL) ..................... 2020665
Jun. 27, 2018 (NL) ..................... 2021188

(51) Int. Cl.
*A01G 9/24* (2006.01)
*A01G 9/04* (2006.01)

(52) U.S. Cl.
CPC ............ *A01G 9/246* (2013.01); *A01G 9/047* (2013.01)

(58) Field of Classification Search
CPC ........ A01G 9/24; A01G 9/047; A01G 9/1423; A01G 9/1476; A01G 31/00; A01G 31/02
See application file for complete search history.

(56) References Cited

U.S. PATENT DOCUMENTS

| 1,506,904 A | 9/1924 | Harrison |
| 3,824,909 A | 7/1974 | Horneff et al. |
| (Continued) | | |

FOREIGN PATENT DOCUMENTS

| EP | 0031985 A1 * | 7/1981 |
| EP | 0031985 A1 | 7/1981 |
| (Continued) | | |

OTHER PUBLICATIONS

International Search Report and Written Opinion of PCT/EP2019/057363; dated Jul. 4, 2019; 11 pgs.

(Continued)

*Primary Examiner* — Kristen C Hayes
(74) *Attorney, Agent, or Firm* — Perilla Knox & Hildebrandt, LLP (57) ABSTRACT

An air distribution conduit (1) for use in a greenhouse defined by an elongated lower end (2) of an elongated cultivation gutter (3) and by an elongated flexible sheet (4) having two elongated side ends (5,6) which elongated side ends (5,6) are connected to the elongated cultivation gutter (3) and wherein the conduit (1) is provided with multiple openings (12,19) along its length fluidly connecting the interior (13) of the conduit (1) with the exterior (14) of the conduit (1).

8 Claims, 9 Drawing Sheets

(56) References Cited

U.S. PATENT DOCUMENTS

| | | | | | |
|---|---|---|---|---|---|
| 4,291,499 | A | * | 9/1981 | Prewer | ............... A01G 31/02 47/84 |
| 5,193,306 | A | * | 3/1993 | Whisenant | ......... A01G 13/0237 47/62 R |

FOREIGN PATENT DOCUMENTS

| | | | | | |
|---|---|---|---|---|---|
| EP | 1464219 | A1 | | 10/2004 | |
| EP | 1923614 | A2 | | 5/2008 | |
| EP | 2002707 | A1 | * | 12/2008 | ............. A01G 31/02 |
| EP | 2002707 | A1 | | 12/2008 | |
| FR | 2713317 | A1 | | 6/1995 | |
| GB | 1242500 | A | | 11/1969 | |
| NL | 8900298 | A | | 9/1990 | |
| WO | 0076296 | A1 | | 12/2000 | |
| WO | 2004032606 | A1 | | 4/2004 | |
| WO | 2004045272 | A1 | | 6/2004 | |
| WO | 2008002686 | A2 | | 1/2008 | |
| WO | 2011028100 | A2 | | 3/2011 | |
| WO | 2011071511 | A1 | | 6/2011 | |
| WO | 2013170361 | A1 | | 11/2013 | |
| WO | 2015012698 | A1 | | 1/2015 | |
| WO | 2017176114 | A1 | | 10/2017 | |
| WO | 2018111100 | A1 | | 6/2018 | |

OTHER PUBLICATIONS

Kim et al., "Improving the Distribution of Temperature by a Double Air Duct in the Air-Heated Plastic Greenhouse", Journal of Bio-Environment Control, vol. 13(3), pp. 162-166, 2004.

* cited by examiner

AIR DISTRIBUTION CONDUIT

FIELD OF THE INVENTION

The invention is directed to an air distribution conduit for use in a greenhouse.

BACKGROUND

Such air distribution conduits for use in a greenhouse are described in EP1923614. This publication describes such conduits as tubes provided with openings suspended below cultivation gutters or cultivation drainpipes by means of multiple hooks connected to a carrier provided along the upper end of the tubes. Such air distribution tubes aim to distribute air to the cultivation positioned above the tubes. A disadvantage of using such tubes is that their installation below the cultivation drainpipes is very labour intensive. Especially when one realises that the suspension hooks are spaced at about 0.3 m, that single tubes may have a length of more than 120 meters and that in a single greenhouse sometimes up to 300 parallel positioned tubes are installed. A next disadvantage is that the air exiting the openings in the up-flow part of the tube will have a directional component in the direction of the tube. This is not desired because undesired air circulation within the greenhouse may result.

This problem of undesired air flow within the greenhouse is addressed in Tae Young Kim et al., "Improving the distribution of temperature by a double air duct in the air-heated plastic greenhouse", Journal of bio-environment control ISSN: 1229-4675, vol. 13, no. 31 January 2004 (2004-01-01), pages 162-166. This journal article describes an air distribution tube for use in a greenhouse wherein the tube is provided with an inner tube. Within the inner tube air travels from a ventilator to a dead end. Along its route air passes the tube wall to flow into an annular space between inner and outer tube. In this way the varying air velocity within the inner tube is converted into a substantially constant pressure in the annular space. This results in that air is substantially equally discharged along the length of the outer tube. WO2011028100 also describes an air distribution tube provided with an inner tube for use in a greenhouse. This double ducting effect for equal discharge of air was well known and for example described in GB1242500, FR2713317 and U.S. Pat. No. 3,824,909.

EP2002707 describes a tube wherein the plant roots extend into the interior of the tube. The tube may be provided with a channel to provide CO2 to the roots and a gutter for draining water surplus.

EP0031985 describes an inflatable tube having an upper and lower end. In the upper end a plant may grow and their roots may extend to the lower end via slits as present in a boundary layer. To this lower end nutrients may be supplied in the form of airborne droplets which may settle on the roots to promote growth.

EP2002707 and EP0031985 do not describe air distributing conduits which may distribute air into a greenhouse.

WO2011/071511 describes a conduit consisting of an inner tube within an outer tube. The resulting annular space is divided into multiple compartments. The air flows from the inner tube via openings to the various compartments and from these compartments into the greenhouse. A complex arrangement of openings seems to be required to achieve an equal distribution of air along the length of the tube. A further disadvantage of this tube is the complexity which results from the use of the multiple compartments.

SUMMARY

The present invention aims to provide an air distribution conduit which can be easily installed and preferably provides a substantial equal distribution of air along its length. This is achieved by the following air distribution conduit. An air distribution conduit for use in a greenhouse defined by an elongated lower end of an elongated cultivation gutter and by an elongated flexible sheet having two elongated side ends which elongated side ends are connected to the elongated cultivation gutter and wherein the conduit is provided with multiple openings along its length fluidly connecting the interior of the conduit with the exterior of the conduit.

Applicants found that by using an elongated flexible sheet a simpler connection can be made with the elongated cultivation gutter as compared to the tube suspended below the cultivation gutter. In the novel conduit part of the conduit is provided by the lower end of the cultivation gutter itself and part is provided by the elongated sheet. This not only omits the need to fabricate a tube provided with carrier means to suspend the tube. It also enables one to use a simple sheet which can be attached in an easier method to the cultivation gutter. Further advantages will be described when discussing the preferred embodiments and figures.

In this description of the invention terms as upper, lower, above and below are used to describe the invention. These terms describe the invention as it is most likely to be applied in a greenhouse. The terms are in no way to be used to limit the scope of protection.

The flexible sheet may be made of a flexible material. Preferably this material is a polymer, such as for example polypropylene.

The sheet may be connected directly to the elongated cultivation gutter or via an intermediate part. The sheet is preferably connected to cultivation gutter or to an intermediate connecting part in a manner which enables simple installation of the sheet. In one preferred embodiment the connection is by means of an elongated rope as present at the elongated edge of the sheet. Such a rope can slide within a guiding profile strip as present on the cultivation gutter or on the optional intermediate part. Such a connection between a sheet provided with a rope and a guiding profile strip may for example be performed as is known for connecting the luff of a main sail to a guiding profile strip as present on a mast of a sailing vessel. The rope may be made by folding the end of the sheet thereby creating a thicker end of the sheet. Alternatively, the rope may be an actual rope which is connected to the side of the sheet by for example sewing, gluing or welding. The elongated ends of the sheet may also be connected to an intermediate part by clamping the sheet between two interlocking parts of the intermediate part or cultivation gutter.

The sheet may be provided with openings along its length. The multiple openings of the conduit will then comprise the multiple openings in the flexible sheet. Through these openings air as being transported through the conduit is discharged from the interior of the conduit to the exterior of the conduit. In combination or alternatively the multiple openings of the conduit may be present in the cultivation gutter itself or more preferably in the intermediate connecting part which connects the sheet with the cultivation gutter. The air distribution conduit preferably discharges air along its length such that the amount of discharged air is equally distributed along its length and wherein the direction of the discharged air as it flows upwardly along the cultivation is a substantially vertical flow. The air distribution conduits are suitably closed or substantially closed at a downstream end and connected to an air displacement means, like a ventilator, at its upstream end. This results in that the air velocity will decrease along the length of the conduit and the static air pressure will increase. If no special measures are taken more air will exit the downstream openings in the conduit and the air discharged from the upstream openings will have a directional component resulting from the air direction within the conduit as for example explained by FIG. 3 of GB1242500.

Preferably a tube within the conduit according to the invention is positioned to achieve a more equal air outflow along the length of the conduit. This tube would be connected to the air displacement means resulting in that air would travel via this inner tube to a space between the walls of inner tube and the air distribution conduit and from there to the exterior of the air distribution conduit.

A disadvantage of such a tube within a conduit embodiment is that the installation of the inner tube within the air distribution conduit is laborious. For this reason it is preferred to position a second conduit adjacent to the air distribution conduit according to the invention. This second conduit is preferably formed by a further elongated flexible sheet having two elongated side ends which elongated side ends are connected to the elongated cultivation gutter either directly or via the intermediate connecting part. The use of the flexible sheet is advantageous because they are simpler to manufacture than a tube. The two adjacent conduits will be fluidly connected to each other along their length via openings in one of the sheets. The air distribution conduit or the second conduit may be connected to the air displacement means as will be illustrated in the figures.

The cultivation gutter may comprise of a central strip for supporting the cultivation and two lower positioned gutters to which water can flow from the higher positioned cultivation. The gutters suitably have an upwardly directed outer wall such that a channel results in which water may flow. The sheet or sheets may be connected directly to the cultivation gutter and more preferably to the outer wall of the gutter. The outer wall may be provided with a guiding profile strip for receiving the earlier referred to rope of the sheet. It may be envisaged that the upwardly directed outer wall is extended with a downwardly directed flap which flap is provided with such a guiding profile strip. The flap itself may be provided with openings which may serve as the openings of the air distribution conduit connecting the interior of the conduit with the exterior of the conduit. These cultivation gutters are preferably made from plate metal and preferably made by roll forming a metal plate. The cultivation gutters may be formed on-site from a single role of metal by means of roll forming.

The cultivation gutter fluidly separates the cultivation positioned on top from the internal space of the air distribution conduit. In the air distribution conduit the roots of the cultivation do not extend into the interior of the air distribution conduit.

Adding such a flap, guiding profile and openings to a cultivation gutter may be complex when the cultivation gutter is made by roll forming from a single role of metal. It may therefore be preferable to use an intermediate connecting part which is connected to each of the two gutters and more preferably to each outer upwardly directed gutter wall. The intermediate part may be provided with openings. Preferably the intermediate connecting part is provided with openings which result in a substantial perpendicular outflow direction of the air as it is discharged from the air distribution conduit into the greenhouse growing section. This may be achieved by providing multiple channels directed perpendicular to the flow direction of the air in the air distribution conduit and positioned along the length of the air distribution conduit. Preferably the intermediate connecting part is a hollow part provided with openings connecting the hollow space with the interior of the air distribution conduit and openings connecting the hollow space with the greenhouse growing section. This hollow space may level out some of the differences of the static pressure within the air distribution conduit resulting in a more equal outflow of air into the greenhouse growing section. Such a hollow intermediate connecting part may be made from two elongated parts, each made on site by means of roll forming, which parts may be connected by means of a clamping connection. In this clamping connection the sheet may be sandwiched by these two parts resulting in a connection between sheet and intermediate connecting part.

The air distribution conduits according the invention are preferably used in a greenhouse. The invention is also directed to a greenhouse provided with these air distribution conduits. Preferably multiple parallel positioned air distributions conduits are present in such a greenhouse. The upflow end of the air distribution conduits may be positioned near one of the end or side walls of the greenhouse. More preferably the ends are fluidly connected to a corridor running along the side or end of the greenhouse. In such corridor air from external the greenhouse, air from within the greenhouse and/or their mixtures may be optionally conditioned before the air is provided to the upflow end of the air distribution conduits. It may even be possible that the upflow end of one group of parallel positioned air distribution is fluidly connected to one corridor at one side or end of the greenhouse and that another group is fluidly connected to a corridor at an opposite end or side wall of the greenhouse. Conditioning may include cooling, heating, humidifying or dehumidifying the air. Such air conditioning corridors are well known and for example described in EP1464219, WO2004032606, WO0076296, WO2015/012698 and WO2008002686.

BRIEF DESCRIPTION OF THE DRAWING FIGURES

The invention is illustrated by the following figures.

DETAILED DESCRIPTION OF EXAMPLE EMBODIMENTS

Figure 1:
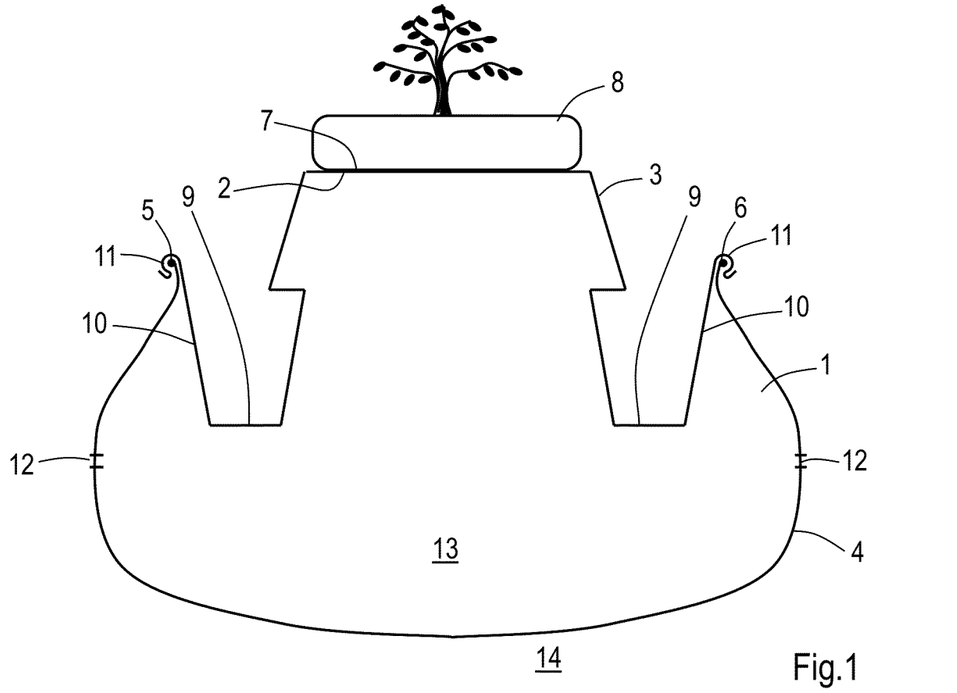
FIG. 1 shows a cross-sectional view AA' of an air distribution conduit.
Figure 2:
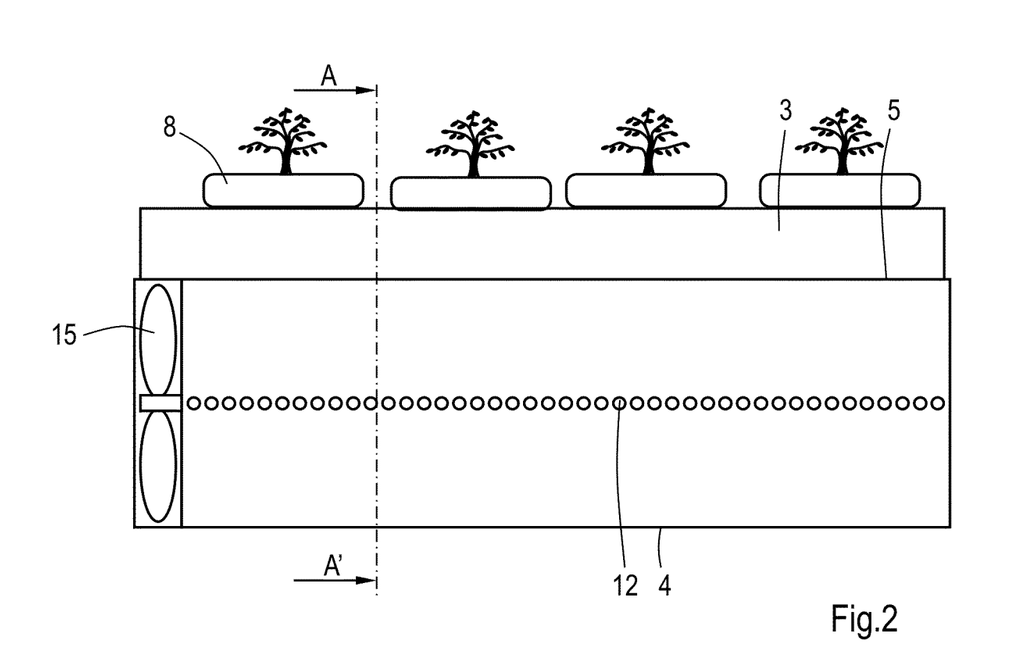
FIG. 2 shows the up-flow part of conduit (1) of FIG. 1 from aside.

FIG. 1 shows a cross-sectional view AA' of an air distribution conduit (1) shown in FIG. 2. The conduit (1) is defined by the lower end (2) of an elongated cultivation gutter (3) and by an elongated flexible sheet (4). Sheet (4) has two elongated side ends (5,6) connected to the elongated cultivation gutter (3). The cultivation gutter (3) has a central strip (7) for supporting a cultivation (8) and two lower positioned gutters (9) at each side to which water can flow from the higher positioned cultivation (8). The gutters (9) have an upwardly directed outer wall (10) such that a channel results in which water may flow. The sheet (4) is connected directly to the upper end (11) of the outer wall (10) of the gutter (9). The outer wall is provided with a guiding profile strip at upper end (11) for receiving a rope as provided at the ends (5,6) of the sheet (4) as shown in more detail in FIG. 9A and FIG. 10 for a two-sheet embodiment. The sheet (4) is provided with multiple openings (10) along its length fluidly connecting the interior (12) of the conduit (1) with the exterior (13) of the conduit (1).

FIG. 2 shows the up-flow part of conduit (1) of FIG. 1 from aside. A conduit (1) in a typical greenhouse application will have a considerably longer length than in FIG. 2. At the up-flow end of conduit (1) a fan (15) is shown. This fan draws in air into the conduit (1). The air may be air from the exterior of the greenhouse, recirculating air from within the greenhouse or mixtures of these air flows. The up-flow ends of a multitude of parallel positioned conduits may be fluidly connected to a mixing corridor at a wall of the greenhouse where air from the exterior of the greenhouse, recirculating air from within the greenhouse or mixtures of these air flows can be fed to the multiple fans (15) as for example described in applicant's WO17176114.

Figure 3:
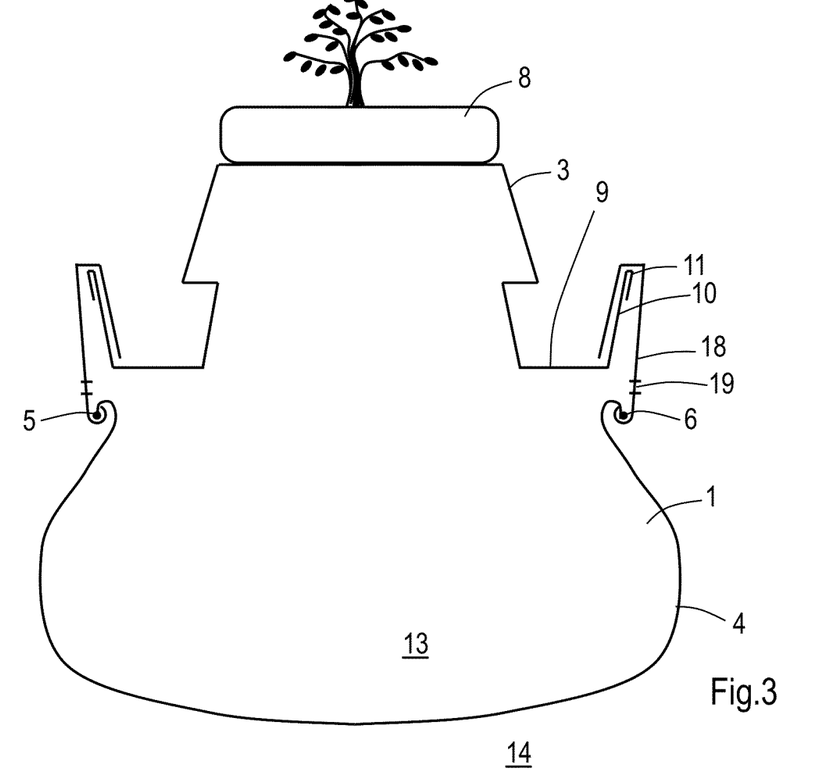
FIG. 3 shows a cross-sectional view AA' of an air distribution conduit (1) shown in FIG. 4.
Figure 4:
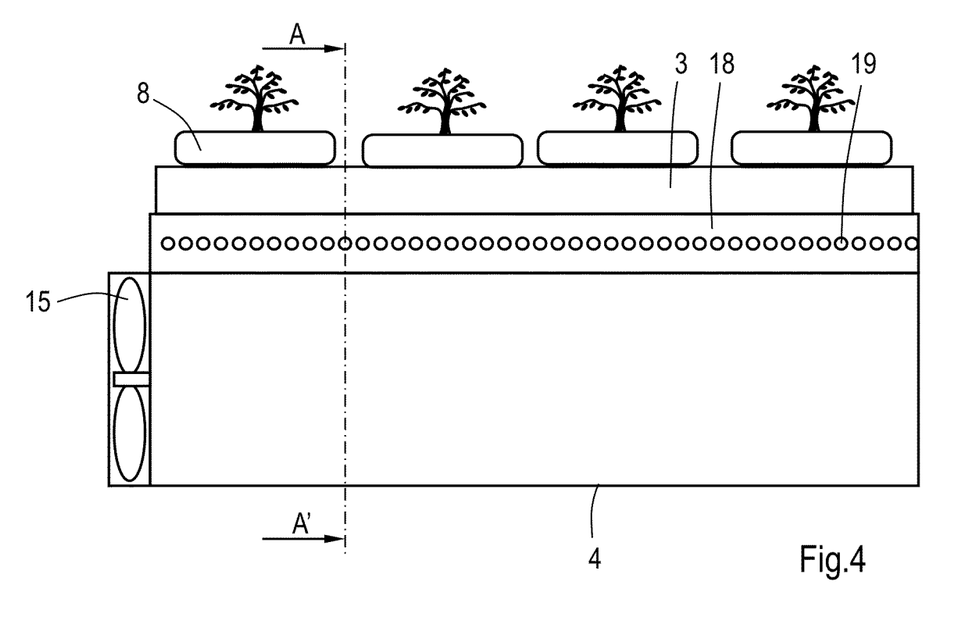
FIG. 4 shows the up-flow part of conduit (1) of FIG. 3 from aside.

FIG. 3 shows a cross-sectional view AA' of an air distribution conduit (1) shown in FIG. 4. As in FIG. 1 the conduit (1) is defined by the lower end (2) of an elongated cultivation gutter (3) and by an elongated flexible sheet (4). The sheet (4) is connected to the gutter (3) via an intermediate connecting part (18). Connecting part (18) as shown may be a folded metal strip provided with a row of openings (19) along its length. The upper part of the strip (18) is folded such that it can suspend from the upper end (11) of the outer wall (10) of the gutter (9). The lower end of the strip (18) may be provided with a guiding profile strip for receiving a rope as provided at the ends (5,6) of the sheet (4) as shown in more detail in FIG. 9A and FIG. 10 for a two-sheet embodiment.

FIG. 4 shows the up-flow part of conduit (1) of FIG. 3 from aside.

Figures 5, 6:
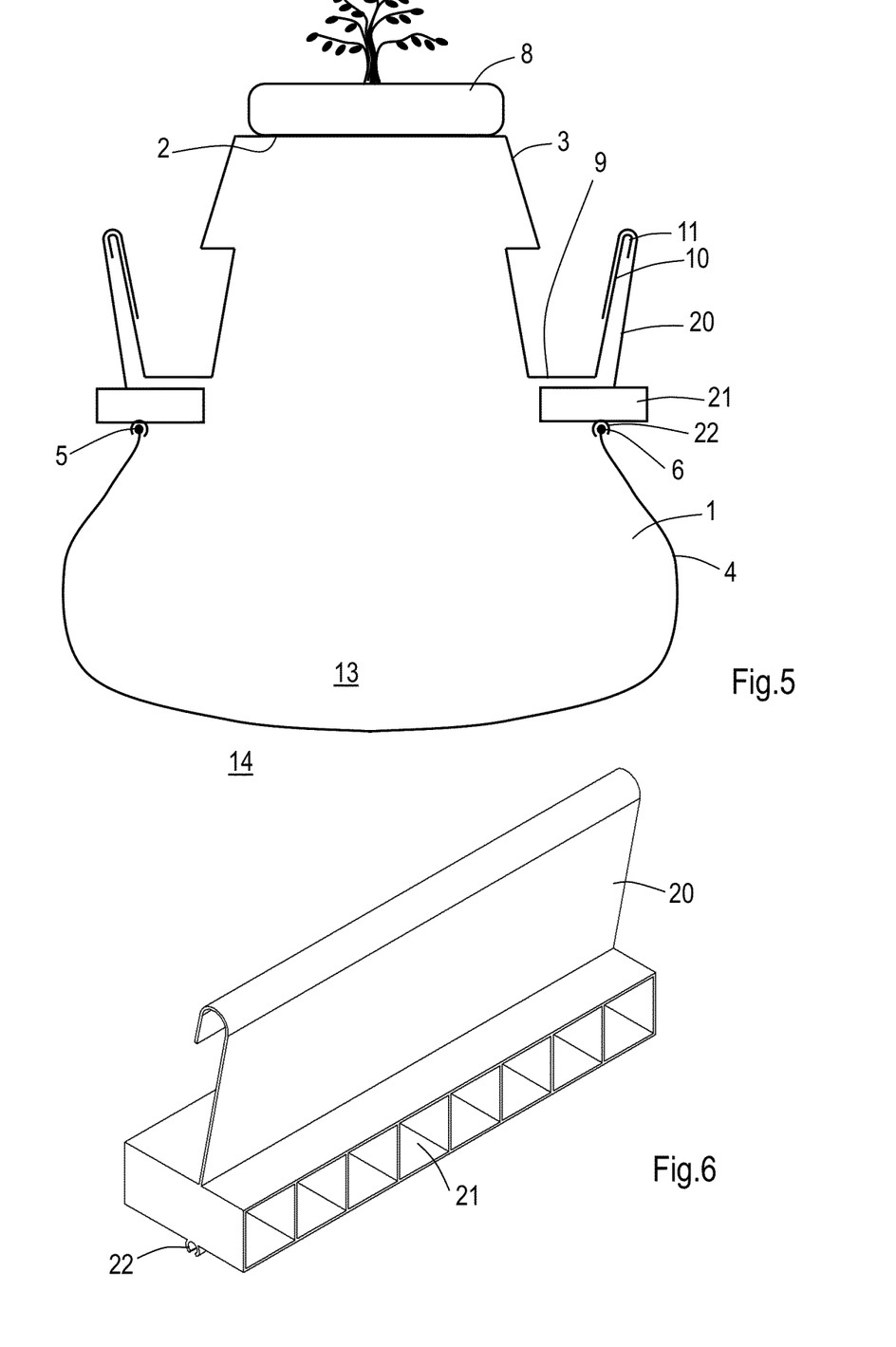
FIG. 5 shows a conduit (1) with an alternative intermediate connecting part (20).
FIG. 6 shows outflow channels (21) which direct the air in a perpendicular direction with respect to the air flow conduit in more detail.

FIG. 5 shows a conduit (1) with an alternative intermediate connecting part (20). This part (20) is provided with multiple outflow channels (21) which direct the air in a perpendicular direction with respect to the air flow within the conduit (1) as shown in more detail in FIG. 6. By choosing a sufficient length of these channels (21) relative to its cross-flow area the air will have a substantial perpendicular direction when it is discharged to the exterior (14) of conduit (1). The part (20) has a folded upper end such that it can be suspended from the upper end (11) of the outer wall (10) of the gutter (9) and is provided with a guiding profile (22) for connection with the ends (5,6) of sheet (4).

Figure 7:
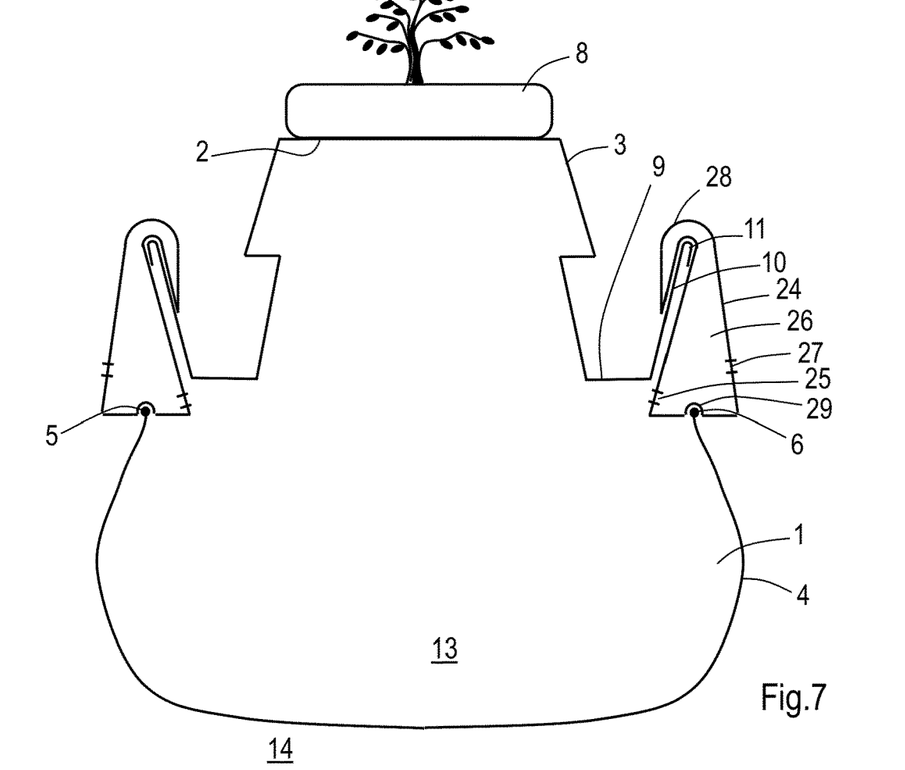
FIG. 7 shows a conduit (1) with an alternative intermediate connecting part (24).

FIG. 7 shows a conduit (1) with an alternative intermediate connecting part (24). The connecting part (24) is an elongated hollow part provided with openings (25) connecting the hollow space (26) with the interior (13) of the air distribution conduit (1) and openings (27) connecting the hollow space (26) with the greenhouse growing section at the exterior (14). This hollow space (26) levels out some of the differences of the static pressure within the air distribution conduit (1) resulting in a more equal outflow of air into the greenhouse growing section via openings (27). The connecting part (24) is suspended from the upper end (11) of the outer wall (10) of the gutter (9) by means of a bended section (28) at its upper end. At its lower end part (24) is provided with a guiding profile (29) for connection with the ends (5,6) of sheet (4).

Figure 8:
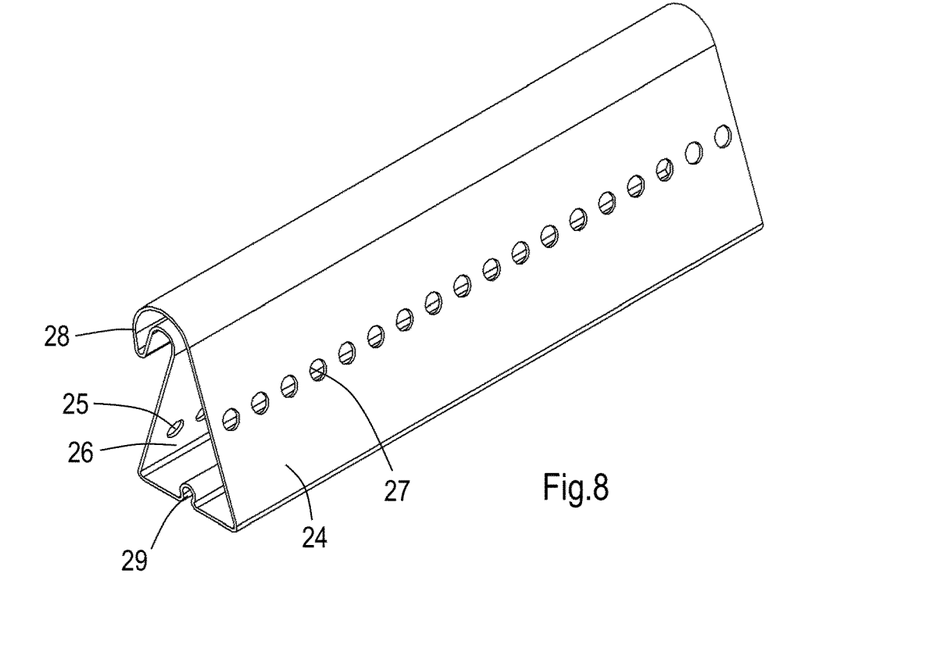
FIG. 8 shows connecting part (24) of FIG. 7 in more detail.
Figure 9:
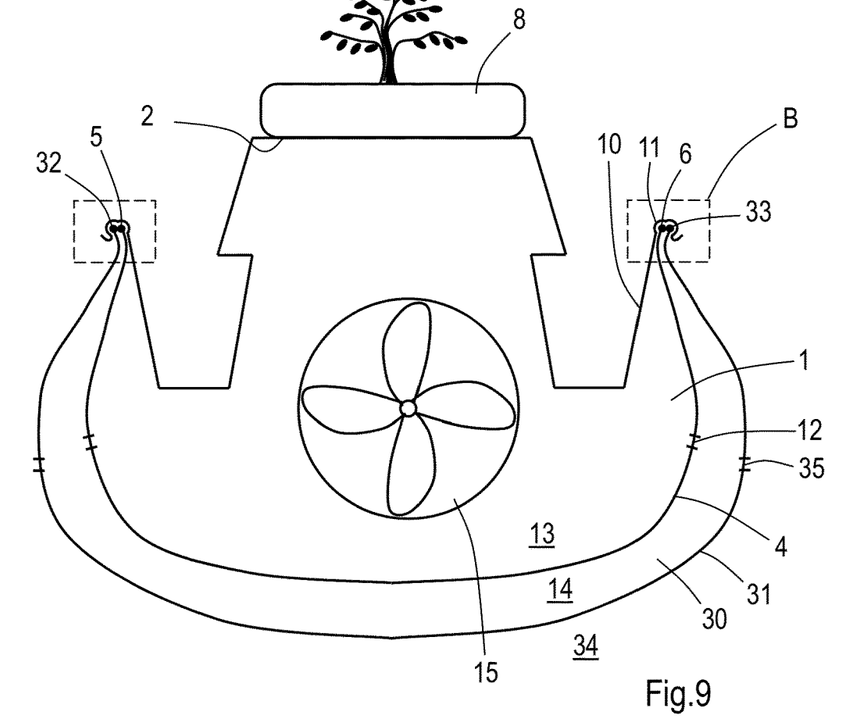
FIG. 9 shows an embodiment wherein adjacent to the air distribution conduit (1) a second conduit (30) is positioned.
Figure 10:
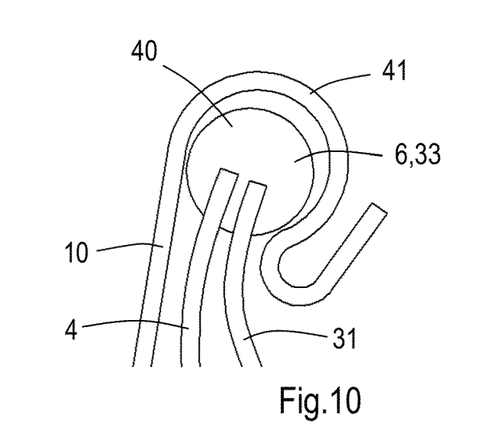
FIG. 10 sho ws another example of low end (6) o et od end (33) of sheet (31) are connected to the upper end (11) of the outer wall (10) of the gutter (9).

FIG. 8 shows an embodiment wherein adjacent to the air distribution conduit (1) a second conduit (30) is positioned. according to the invention. This second conduit is formed by a further elongated flexible sheet (31) having two elongated side ends (32,33). The elongated side ends of sheet (31) are directly connected to the elongated cultivation gutter (9) in this figure. Two possible connections for detail B is shown in FIGS. 9 and 10. Alternatively a connecting part may be used. Upstream in conduit (1) a fan (15) is present. The conduit (1) is fluidly connected to conduit (30) by means of its openings (12) in sheet (4) along its length. Conduit (30) is fluidly connected to its exterior (34) by means of openings (35) along the length of sheet (31). Conduit (30) levels out some of the differences of the static pressure within the air distribution conduit (1) resulting in a more equal outflow of air into the greenhouse growing section via openings (35).

Figure 9A:
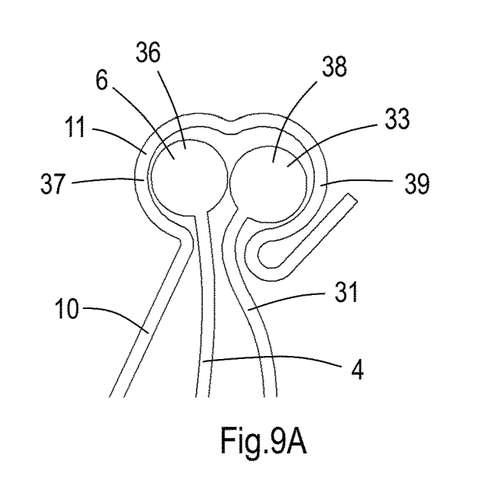
FIG. 9a shows an example of how end (6) of sheet (4) and end (33) of sheet (31) of FIG. 9 are connected to the upper end (11) of the outer wall (10) of the gutter (9).

FIG. 9A shows an example of how end (6) of sheet (4) and end (33) of sheet (31) are connected to the upper end (11) of the outer wall (10) of the gutter (9). End (6) is provided with a rope (36) which travels within guiding profile (37). End (33) is provided with a rope (38) which travels within a guiding profile (39).

FIG. 10 shows another example of how end (6) of sheet (4) and end (33) of sheet (31) are connected to the upper end (11) of the outer wall (10) of the gutter (9). Ends (6) and (33) are connected to the same rope (40) which travels guiding profile (41).

The invention is thus also directed to an air distribution conduit wherein at the exterior (14) of the conduit (1) a second flexible elongated sheet (31) having two elongated side ends (32,33) is connected via its elongated side ends (32,33) to the elongated cultivation gutter (4) thereby creating a second conduit (30) positioned substantially below the first conduit (1),
  wherein the openings (12) in the sheet (4) fluidly connect the interior (13) of the conduit (1) and the interior of the second conduit (30),
  wherein the second sheet (31) is provided with openings (35) along its length fluidly connecting the interior of the second conduit (30) with the exterior (34) of second conduit (30) and
  wherein the interior (13) of conduit (1) is fluidly connected to an air displacement means (15) which air displacement means (15) in use supply a flow of air to one end of the conduit (1).

Figure 11:
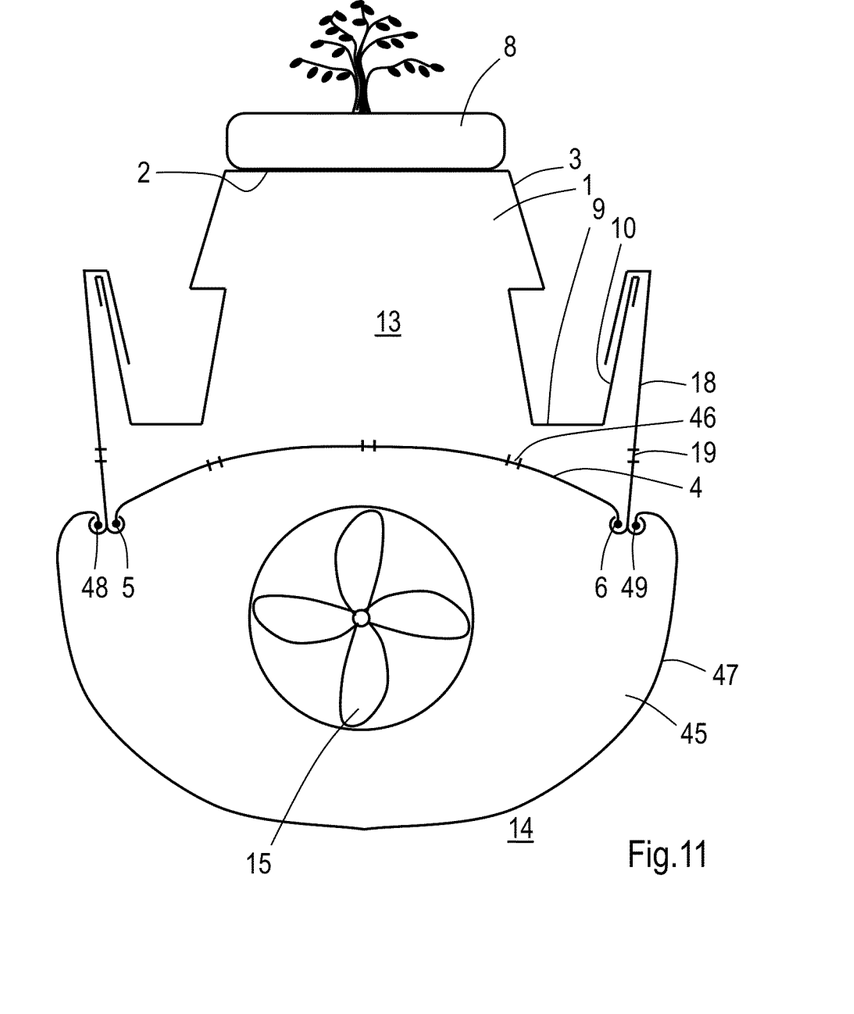
FIG. 11 sho duit (1) as in FIG. 3 wherein a second conduit (45) is positioned adjacent to conduit (1).

FIG. 11 shows a conduit (1) as in FIG. 3 wherein a second conduit (45) is positioned adjacent to conduit (1). A difference with the embodiment of FIG. 8 is that the fan (15) is now positioned upstream conduit (45). The air flowing through conduit (45) can flow to conduit (1) via openings (46) as present along the length of sheet (4). Conduit (1) levels out some of the differences of the static pressure within the air distribution conduit (45) resulting in a more equal outflow of air into the greenhouse growing section via openings (35). Conduit (45) is formed by sheet (47) and by sheet (4). The ends (5,6) of sheet (4) and the ends (48,49) of sheet (47) are connected to the lower end of connecting part (18) via guiding profiles as shown before.

The invention is thus also directed to an air distribution conduit wherein at the exterior of the conduit (1) a second flexible elongated sheet (47) having two elongated side ends (48,49) is connected via its elongated side ends (48,49) via a connecting part (18) to the elongated cultivation gutter (4) thereby creating a second conduit (45) positioned substantially below the first conduit (1),
  wherein sheet (4) is provided with openings (46) along its length fluidly connecting the interior (13) of conduit (1) with the interior of second conduit (45) and
  wherein the interior of the second conduit (45) is fluidly connected to an air displacement means (15) which air displacement means (15) in use supply a flow of air to one end of the conduit (45).

Figure 12:
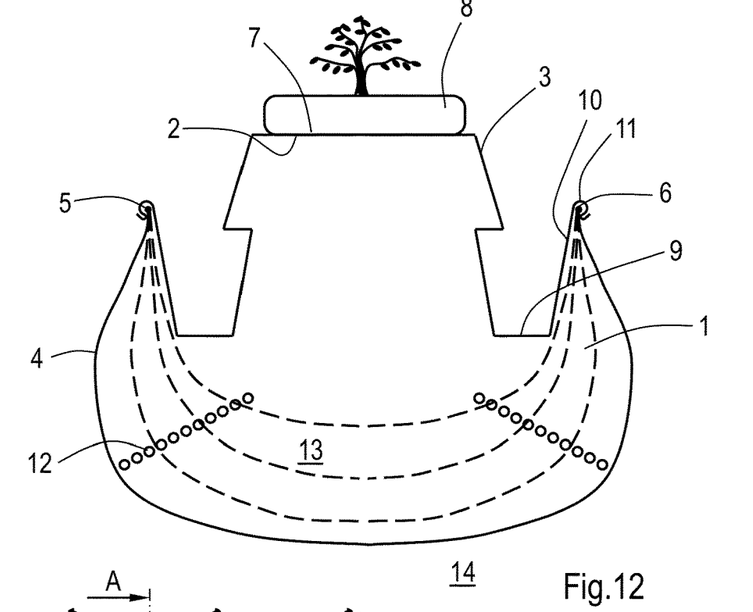
FIG. 12 and FIG. 13 show a conduit (1) as in FIGS. 1 and 2 wherein the cross-sectional area decreases in the direction of the air flow within said conduit (1).
Figure 13:
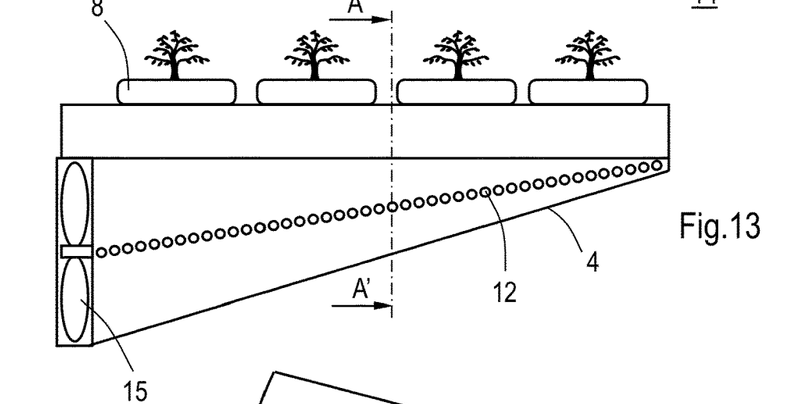

FIGS. 12 and 13 shows a conduit (1) as in FIGS. 1 and 2 wherein the cross-sectional area decreases in the direction of the air flow within said conduit (1). This embodiment makes use of the principles laid down in for example U.S. Pat. No. 1,506,904 and WO2018111100. WO2018111100 describes such a conduit which may be supported by battens. The presently shown conduit is advantageous compared to the conduit of WO2018111100 because it does not require battens.

Figure 14:
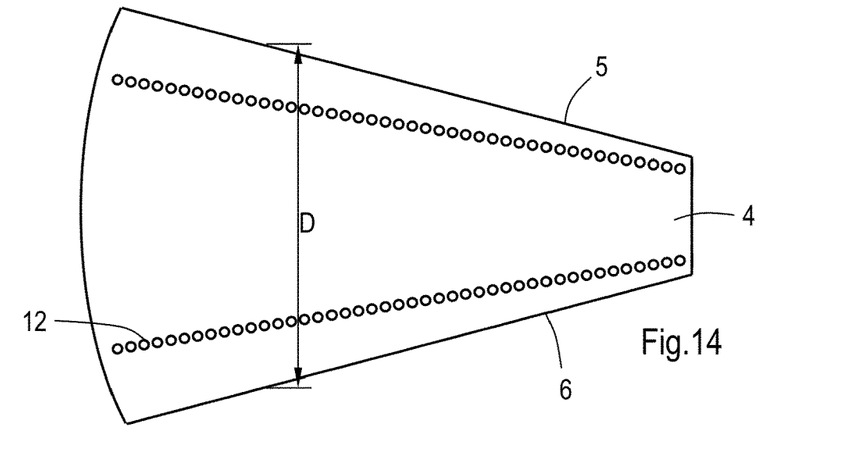
FIG. 14 shows a possible sheet (4) having a gradually decreasing diameter D in the direction of the air flow within said conduit (1).

FIG. 14 shows a possible sheet (4) having a gradually decreasing diameter D in the direction of the air flow within said conduit (1). This sheet has two elongated side ends (5,6) which can connect to the cultivation gutter (3) to obtain an air distribution conduit of FIGS. 12 and 13.

Figure 15:
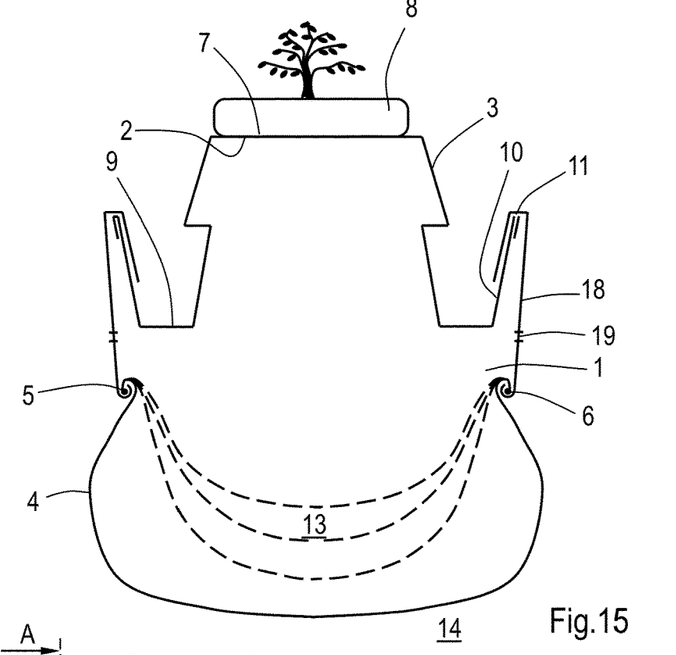
FIG. 15 and FIG. 16 show a conduit (1) as in FIGS. 3 and 4 wherein the cross-sectional area decreases in the direction of the air flow within said conduit (1).
Figure 16:
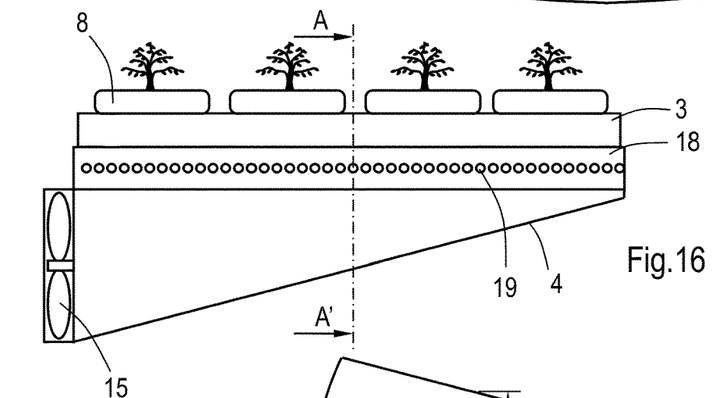
Figure 17:
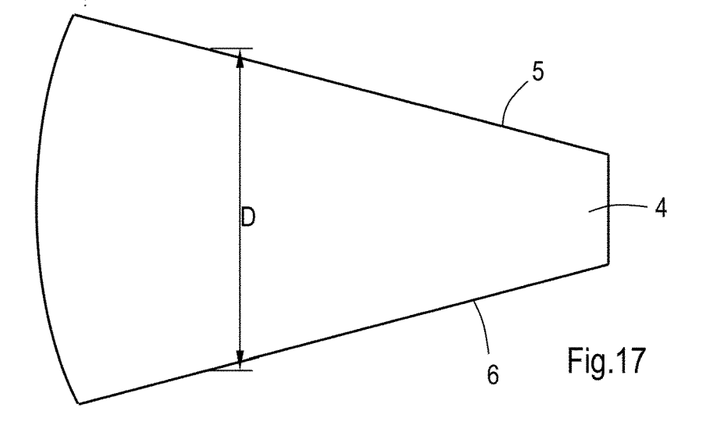
FIG. 17 shows further detail of an example embodiment of the sheet (4).

FIGS. 15 and 16 show a conduit (1) as in FIGS. 3 and 4 wherein the cross-sectional area decreases in the direction of the air flow within said conduit (1). The sheet (4) itself does not have openings as shown in FIG. 17.

The conduits shown in these Figures are not drawn according to scale. The length may for example be more than 120 meters while the diameter of for example a conduit shown in FIG. 1 may be for example 80 cm.

The invention is thus also directed to a conduit wherein the distance D between the two elongated side ends (5,6) of sheet (4) decreases along the length of the sheet (4) in the direction of the air flow direction within said conduit (1).

Figure 18:
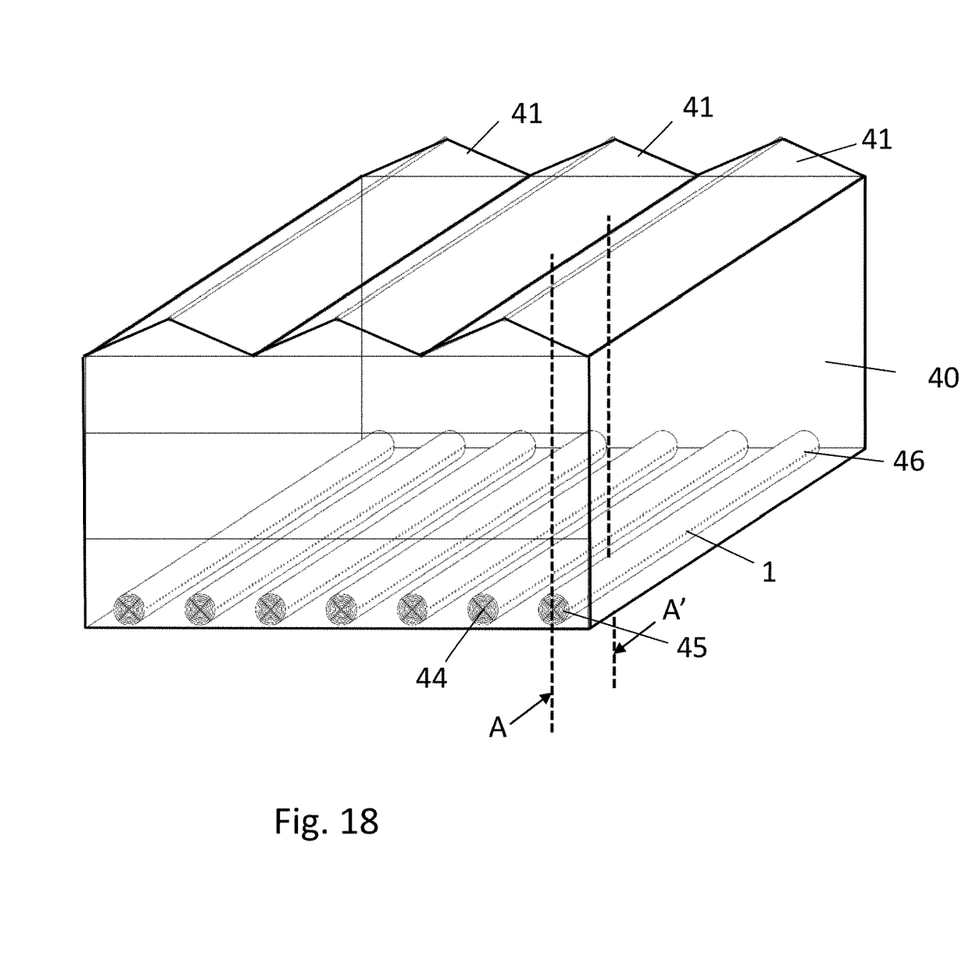
FIG. 18 shows a greenhouse (40) provided with multiple parallel positioned air distribution conduits (1).

FIG. 18 shows a greenhouse (40) provided with multiple parallel positioned air distribution conduits (1). The greenhouse (40) is provided with three saddle roofs (41). A commercial greenhouse may have between 1 and 100 or even more than 100 of such saddle roofs (41). At the floor of the greenhouse (40) seven ducts (1) are shown. A greenhouse may have between 2 and 250 or even more of such parallel positioned ducts (1). The ducts (1) run parallel with the saddle roof (41) in FIG. 18. It is also possible to position the ducts (1) perpendicular to the direction of the saddle roof (41). Air is distributed from these ducts via openings (42) to the interior (43) of the greenhouse as for example illustrated in FIGS. 1-17. The driving force for this distribution of air is provided with fans (44) at the up flow end (45) of the conduit (1). The opposite down flow end (46) of conduit (1) is closed. The air entering fans (44) is preferably conditioned in an air conditioning mixing zone as shown in FIG. 19.

Figure 19:
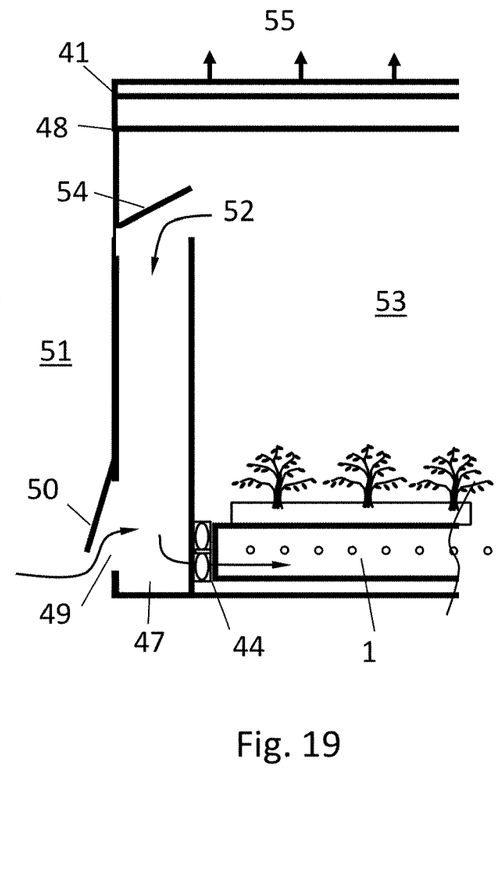
FIG. 19 shows a cross section AA' of semi-closed greenhouse (40) shown in FIG. 18, wherein the conduits (1) are fluidly connected to a corridor (47) positioned at one end wall (48) of the greenhouse.

In FIG. 19 shows a cross section AA' of semi-closed greenhouse (40) shown in FIG. 18, wherein the conduits (1) are fluidly connected to a corridor (47) positioned at one end wall (48) of the greenhouse. The end wall (48) is provided with one or more openings (49) which may be opened or closed by means of a shutter (50) to take in air from the exterior (51) of the greenhouse. Further an air conditioning mixing zone corridor (47) is shown where air from the exterior (51) and air (52) from within the greenhouse (40) can mix. The thus mixed air is distributed to the interior (53) via conduits (1). The mixing zone corridor (47) may be a single space running along the full length of a side wall or preferably a single space running along the entire end gable (48) of the greenhouse (40). The position of shutter (54) is preferably elevated enough to achieve a flow of air in the direction of shutter (54) which is substantially above the vegetation in the greenhouse. The amount of air (52) from within the greenhouse entering the mixing zone corridor (47) may be controlled by shutter (54). By controlling shutters (50) and (54) it is possible to control the climate conditions, like temperature, within the greenhouse. The roof will be provided with openings (55) to avoid a pressure build up when external air is drawn in. The amount of air entering the greenhouse via means (49) will be about the same amount of air leaving the greenhouse via the openings in ridge beam as air (55).

The invention claimed is:
1. An air distribution conduit for use in a greenhouse defined by an elongated lower end of an elongated cultivation gutter and by an elongated flexible sheet having two elongated side ends which elongated side ends are connected to the elongated cultivation gutter and wherein the conduit is provided with multiple openings along its length fluidly connecting the interior of the conduit with the exterior of the conduit;
  wherein the cultivation gutter comprises of a central strip for supporting a cultivation and two lower positioned gutters to which water can flow from a higher positioned cultivation; and
  wherein the cultivation gutter is made from plate metal.
2. An air distribution conduit according to claim 1, wherein the sheet is provided with openings along its length and wherein the multiple openings of the conduit comprise the multiple openings in the flexible sheet.
3. An air distribution conduit according to claim 2, wherein at the exterior of the conduit a second flexible elongated sheet having two elongated side ends is connected via its elongated side ends to the elongated cultivation gutter thereby creating a second conduit positioned substantially below the first conduit,     wherein the openings in the sheet fluidly connect the interior of the conduit and the interior of the second conduit,     wherein the second sheet is provided with openings along its length fluidly connecting the interior of the second conduit with the exterior of second conduit, and     wherein the interior of conduit is fluidly connected to an air displacement means which air displacement means in use supply a flow of air to one end of the conduit.

4. An air distribution conduit for use in a greenhouse defined by an elongated lower end of an elongated cultivation gutter and by an elongated flexible sheet having two elongated side ends which elongated side ends are connected to the elongated cultivation gutter and wherein the conduit is provided with multiple openings along its length fluidly connecting the interior of the conduit with the exterior of the conduit;

wherein the elongated side ends of the flexible sheet are connected to the elongated cultivation gutter via a connecting part which part is provided with openings and wherein the multiple openings of the conduit comprise the multiple openings of the connecting part.

5. An air distribution conduit according to claim 4, wherein the connecting part is provided with multiple outflow channels having a direction which is perpendicular with respect to an air flow direction within the conduit.

6. An air distribution conduit according to claim 4, wherein the connecting part is an elongated hollow part provided with openings connecting the hollow space with the interior of the air distribution conduit and openings connecting the hollow space with the exterior of the conduit.

7. An air distribution conduit according to claim 4, wherein at the exterior of the conduit a second flexible elongated sheet having two elongated side ends which ends connect the sheet via the connecting part to the elongated cultivation gutter thereby creating a second conduit positioned substantially below the first conduit,     wherein sheet is provided with openings along its length fluidly connecting the interior of conduit with the interior of second conduit, and     wherein the interior of the second conduit is fluidly connected to an air displacement means which air displacement means in use supply a flow of air to one end of the second conduit.

8. An air distribution conduit for use in a greenhouse defined by an elongated lower end of an elongated cultivation gutter and by an elongated flexible sheet having two elongated side ends which elongated side ends are connected to the elongated cultivation gutter and wherein the conduit is provided with multiple openings along its length fluidly connecting the interior of the conduit with the exterior of the conduit;

wherein the distance D between the elongated side ends of the flexible sheet decreases along the length of the sheet.

* * * * *